US010816515B2

(12) United States Patent
Hollnagel et al.

(10) Patent No.: US 10,816,515 B2
(45) Date of Patent: Oct. 27, 2020

(54) METHOD OF INTRODUCING A SAMPLE INTO A SEPARATION COLUMN AND CORRESPONDING SYSTEM

(71) Applicant: DIONEX SOFTRON GMBH, Germering (DE)

(72) Inventors: Christoph Hollnagel, Gauting (DE); Hermann Hochgraeber, Offenberg (DE); Thomas Wachinger, Altomuenster (DE)

(73) Assignee: Dionex Softron GmbH, Germering (DE)

(*) Notice: Subject to any disclaimer, the term of this patent is extended or adjusted under 35 U.S.C. 154(b) by 224 days.

(21) Appl. No.: 15/809,190

(22) Filed: Nov. 10, 2017

(65) Prior Publication Data

US 2018/0128787 A1    May 10, 2018

(30) Foreign Application Priority Data

Nov. 10, 2016   (DE) ......................... 10 2016 121 515

(51) Int. Cl.
*G01N 30/20* (2006.01)
*G01N 30/14* (2006.01)
*G01N 30/36* (2006.01)

(52) U.S. Cl.
CPC ............ *G01N 30/20* (2013.01); *G01N 30/14* (2013.01); *G01N 30/36* (2013.01); *G01N 2030/207* (2013.01)

(58) Field of Classification Search
CPC .... G01N 30/6034; G01N 30/14; G01N 30/20; G01N 30/24; G01N 2030/027; G01N 2030/201; G01N 2030/202; G01N 2030/385

USPC ..................................................... 73/61.53
See application file for complete search history.

(56) References Cited

U.S. PATENT DOCUMENTS

| 3,530,721 A | 9/1970 | Hrdina |
| 4,939,943 A | 7/1990 | Strohmeier |
| 2003/0143123 A1* | 7/2003 | Maeda .................. G01N 30/24 422/510 |
| 2006/0045810 A1* | 3/2006 | Choikhet ............... G01N 30/20 422/400 |
| 2006/0186028 A1* | 8/2006 | Hughes .................. G01N 30/10 210/198.2 |
| 2007/0251302 A1* | 11/2007 | Iwata ..................... G01N 30/20 73/61.56 |
| 2008/0044309 A1 | 2/2008 | Yamashita et al. |
| 2011/0278214 A1 | 11/2011 | Benevides et al. |

(Continued)

FOREIGN PATENT DOCUMENTS

| CN | 101063495 A | 10/2007 |
| CN | 102460145 A | 5/2012 |

(Continued)

*Primary Examiner* — Peter J Macchiarolo
*Assistant Examiner* — Monica S Young

(57) ABSTRACT

A method of introducing a sample into a separation column includes introducing the sample into a trap column, isolating the trap column from ambient atmosphere and pressurizing the trap column to a first pressure while the trap column is isolated from ambient atmosphere, providing a fluid connection between the trap column and the separation column after pressurizing the trap column to the first pressure, supplying the sample from the trap column to the separation column.

17 Claims, 6 Drawing Sheets

(56) References Cited

U.S. PATENT DOCUMENTS

| | | | | |
|---|---|---|---|---|
| 2012/0024048 A1* | 2/2012 | Maeda | ................... | G01N 30/20 |
| | | | | 73/61.55 |
| 2012/0132013 A1* | 5/2012 | Glatz | ..................... | G01N 30/20 |
| | | | | 73/863.02 |
| 2014/0306105 A1* | 10/2014 | Netto | ...................... | H01J 49/26 |
| | | | | 250/282 |

FOREIGN PATENT DOCUMENTS

| | | |
|---|---|---|
| CN | 104285145 A | 1/2015 |
| CN | 104833745 A | 8/2015 |
| JP | 101221660 A | 9/1989 |

\* cited by examiner

METHOD OF INTRODUCING A SAMPLE INTO A SEPARATION COLUMN AND CORRESPONDING SYSTEM

CROSS-REFERENCE TO RELATED APPLICATION

This application claims the priority benefit under 35 U.S.C. § 119 to German Patent Application No. DE 10 2016 121515.5, filed on Nov. 10, 2016, the disclosure of which is incorporated herein by reference.

FIELD OF INVENTION

The present invention relates to the field of liquid chromatography (LC) and particularly to high pressure liquid chromatography (HPLC). The invention also relates to a sampler for liquid chromatography, especially for high performance liquid chromatography.

BACKGROUND

In LC systems, a liquid sample is introduced with an analytical pump into a separation column. Different constituents of the sample adhere to the separation column in a different manner. A pump pushes a solvent (or different solvents) through the separation column. Depending on, inter alia, the adherence of the constituents to the separation column, the solvent, the flow rate of the solvent and the pressure of the solvent, the different constituents of the sample need different amounts of time to pass through the separation column; generally, the more strongly a constituent interacts with the separation column, the longer it will need to pass through the separation column. This allows the constituents (and thus, the sample) to be determined and analyzed.

Introducing the sample into the separation column typically comprises different steps including (1) a sample pick up means, such as a needle, being introduced into a sample reservoir and picking up the sample. (2) The sample may then be introduced from the needle into a section for intermediate storing of the sample. Subsequently, (3) the sample may be introduced from the section for intermediate storing of the sample into the separation column. For this purpose, injection valves may be used. Such injection valves or distribution valves may connect different ports with one another to establish a fluid connection between different parts or sections of an LC system. For example, U.S. Pat. No. 3,530,721 discloses an apparatus for supplying liquid samples into a separation column. The apparatus includes a switch that can be switched from one state allowing a sample to be drawn into a receptacle (e.g., for carrying our steps (1) and (2)) to another state allowing the sample to be pumped from the receptacle into a column (e.g., for carrying out the above described step (3)). U.S. Pat. No. 4,939,943 discloses an injector including a high pressure syringe unit and a valve unit for LC, which valve unit is adapted to assume different positions, one for sample pick up and one for introducing the sample into a chromatographic column.

A further variant of LC systems includes a so-called trap column. Instead of intermediate storing of the sample in a simple section of tubing or in a simple receptacle, the sample may first be introduced into a trap column and constituents of the sample may adhere to the trap column (which may also be called a "pre-column"). Thus, by means of the trap column, the sample may be concentrated. In other words, when injecting sample into a trap column, the sample is guided with the help of a pumping device into the trap column (or pre-column), i.e. onto the material of the trap column. The sample components remain hanging in the column. The sample can therefore be concentrated. Subsequently, the sample may be entrained in an analytical flow from the trap column through the separation column. Again, switching from the first step (introducing a sample into the trap column) to the second step (providing a flow to introduce the sample from the trap column to the separation column) may be done by switching of a valve. In other words, after introducing the sample into the trap column, the trap column is connected with an analytical flow, the sample detaches from the trap column, and is guided into the separation column (which may also be referred to as an analytical column). The separation of the sample from the trap column is enabled by the interaction of the sample with the column and the flow.

That is, in very simple words, a sample is picked up and introduced into a trap column. The trap column is then fluidly connected to a separation column and the sample is supplied from the trap column to the separation column. The supplying of the sample from the trap column to the separation column is typically done by means of an analytical pump providing a pressure exceeding the atmospheric pressure. In HPLC, this pressure may be on the order of 1000 bar, such as 1500 bar.

However, while the above described prior art may be satisfactory in some instances, it has several disadvantages and limitations. It has been found that the above described method leads to substantial wear of the trap column and the separation column, thereby deteriorating the results of subsequent analyses and/or necessitating an earlier replacement of these components or of the complete system. That is, the lifetime of the system is negatively affected. Furthermore, it has been found that the above described method may lead to undesired mixing of the sample with the solvent (dispersion), thereby also deteriorating the results of subsequent analyses.

SUMMARY

It is therefore an object of the invention to overcome or at least alleviate the shortcomings and disadvantages of the prior art. More particularly, it is an object of the present invention to provide a method for introducing a sample into a separation column, which method leads to an increased lifetime of the system and which method leads to better analytical results.

These objects are met by the method of the present technology.

According to a first embodiment, these objects are met by a method of introducing a sample into a separation column. The method comprises introducing the sample into a trap column, isolating the trap column from ambient atmosphere and pressurizing the trap column to a first pressure while the trap column is isolated from ambient atmosphere, providing a fluid connection between the trap column and the separation column after pressurizing the trap column to the first pressure, and supplying the sample from the trap column to the separation column.

That is, the sample in the trap column is pressurized before it is introduced into the separation or analytical column. This may be different to the prior art, where the trap column was connected to the separation column and then pressurized. That is, in the prior art, when connecting the trap column to the analytical pump and to the separation column, the trap column is rapidly brought from a starting pressure (which typically is similar or equal to atmospheric pressure) to an increased pressure. On the other hand, the separation column is typically at the increased pressure. When fluidly connecting the separation column to the trap column (which initially is at atmospheric pressure)—as in the prior art—the pressure in the separation column will dip rapidly. That is, by means of the known methods, there is a sharp increase in pressure in the trap column and a sharp decrease followed by a sharp increase in pressure in the separation column. It has been found that these sharp pressure spikes are disadvantageous and that it is advantageous not to have these pressure spikes, but to bring the trap column to an increased pressure in a more controller manner. This may reduce wear on the trap column, the separation column and components fluidly connected to these components. Furthermore, by preventing or reducing the pressure spikes, the sample may be less dispersed with solvent, leading to more defined peaks in subsequent analysis, thereby resulting in an improved analysis. All these advantages may be achieved by the present invention, which therefore meets the objects of the present invention.

Generally, introducing the sample into the separation column may include switching of an injection valve. During switching of such an injection valve, compression and decompression volumes flow through the valve with a high speed. These currents can cause damage to the high-pressure valve components. Pressure surges at the columns also lead to high speeds of the sample, so that it can inadvertently mix with the flow. As discussed, the present invention relates to a method that enables pre-compressing of the trap column. Pressure surges and associated fast flows are thus avoided. Put differently, in prior art systems, when the trap column was connected with a pump flow (of an analytical pump), a pressure drop or a pressure collapse occurred in the separation column, as the trap column and its connections (e.g., capillaries) were not at the same pressure as the system. This led to high current speeds (that could damage the valve and the columns) which, particularly for analyses with very small analytical fluxes, were hard to exactly reproduce, thereby also compromising the final analytical results. All this is prevented by the present invention.

That is, the present invention solves problems of a pressure drop by preemptively bringing the trap column to an elevated pressure, e.g. to system pressure. With the help of this invention, the trap column is brought to system pressure before the injection. This helps avoid strong currents at the valve and prevents uncontrolled pressure drop after the injection, as well as undesirable mixing of the sample with the flow (dispersion).

It will be understood that the sample may be a liquid sample. As will further be understood, when the sample is introduced into the trap column, some constituents of the sample will adhere to the trap column while other constituents may not adhere and may flow through the trap column and go to waste (which may also be referred to as a waste reservoir). That is, the sample being introduced and adhering to the trap column does not necessarily have exactly the same composition as the original sample. The same applies to the sample which is supplied from the trap column to the separation column. E.g., depending on the type of solvent used, only some constituents of the sample adhering to the trap column may be introduced to the separation column. For sake of brevity and simplicity of description, however, all of the above will simply be referred to as "the sample"—although it is clear to the skilled person that the sample originally introduced into a system carrying out the described method does not necessarily correspond to 100% to the sample that is supplied to the separation column and subsequently analyzed.

The first pressure may exceed the ambient pressure by at least 10 bar, preferably by at least 100 bar, more preferably by at least 1000 bar, such as by at least 1500 bar.

The method may be carried out by a liquid chromatography system.

The liquid chromatography system may comprise an analytical pump adapted to provide a flow of pressurized fluid.

The method may also comprises providing a fluid connection between the trap column and the analytical pump, wherein the fluid connection between the trap column and the analytical pump is provided simultaneously with providing the fluid connection between the trap column and the separation column. This provides similar benefits as the ones discussed above.

The liquid chromatography system may comprise a metering device.

Introducing the sample into the trap column at a first pressure may comprise the metering device causing a volume of the sample to be sucked into the liquid chromatography system and the metering device may pressurize the trap column to the first pressure. That is, the metering device may also have the functionality of pressurizing the trap column. By having this functionality incorporated in the metering device, there is no need for a further pump for introducing the sample into the trap column. Thus, a less complex system is provided by having the functionality of the pressurization integrated in the metering device. This may be advantageous as a less complex system needs less space, has fewer components that can malfunction and may be simpler to service.

The metering device may comprise a first port and a second port for fluidly connecting the metering device to other components and each of these ports can selectively be opened and closed.

The liquid chromatography system may comprise a sample pick up means, a seat to receive the sample pick up means and a first distribution valve.

Introducing the sample into the trap column may comprise the sample pick up means being moved to a sample reservoir, the sample being sucked into the sample pick up means and optionally into a tubing section adjacent to the sample pick up means, the sample pick up means being moved to the seat, the first distribution valve being set to provide a fluid connection between the seat and the trap column, and the sample being introduced into the trap column.

The sample being introduced into the trap column may be done by means of the metering device. Again, having this functionality performed by the metering device may omit the necessity of further components, thereby rendering the system less complex and leading to the above described advantages.

The method may comprise a solvent being introduced into the metering device through the first port before the sample is introduced into the trap column, wherein introducing the sample into the trap column comprises the solvent being expelled from the metering device through the second port.

The method may comprise a solvent being introduced into the metering device through the first port after the sample is introduced into the trap column, and expelling the solvent from the metering device through the second port.

When introducing the sample into the trap column, the sample may enter the trap column in a first flow direction, and, when supplying the sample from the trap column to the separation column, the sample may leave the trap column in a second flow direction, which second flow direction is opposite to the first flow direction. This procedure may also be referred to as a "backward flush". As will be understood, some components of the sample will remain at an "entrance" of the trap column and will be released during the "backward flush" procedure, i.e., those components will be provided to the separation column without having to travel along a substantial length of the trap column.

Additionally or alternatively, when introducing the sample into the trap column, the sample may enter the trap column in a first flow direction, and, when supplying the sample from the trap column to the separation column, the sample may leave the trap column in the first flow direction. This procedure may also be referred to as a "forward flush". That is, any constituent of the sample reaching the separation column has travelled through the complete length of the trap column before reaching in the separation column. This may lead to a highly purified sample, which may be advantageous in some regards.

The method may comprise depressurizing the trap column after supplying the sample from the trap column to the separation column. In particular, depressurizing the trap column may be done in a controlled manner. Having such a controlled depressurization may be advantageous as it leads to less abrasion on the system components depressurized, prevents fluids from exiting the system rapidly (which could be a safety risk) and reduces the risk of components outgassing in the system.

More particularly, the metering device may depressurize the trap column. Again, having this functionality incorporated in the metering device may be beneficial, as it may lead to a less complex system.

The liquid chromatography system may comprise a waste.

The method may comprise fluidly connecting the trap column to the waste and supplying fluid from the trap column to the waste, wherein the trap column and the waste are fluidly connected after the sample is supplied from the trap column to the separation column.

The trap column and the waste may be fluidly connected after the trap column is depressurized. Again, this may lead to a controller depressurization with the above described benefits.

The method may comprise solvent being introduced into the metering device through the first port and solvent being expelled from the metering device through the second port after fluidly connecting the trap column to the waste.

The liquid chromatography system may further comprise a second distributor valve, wherein each distributor valve comprises a plurality of ports and a plurality of connecting elements for changeably connecting the ports of the respective distributor valve, wherein as regards the first distributor valve, one port is directly fluidly connected to the seat, two ports are directly fluidly connected to the trap column, one port is directly fluidly connected to the separation column, one port is directly fluidly connected to the analytical pump and one port is directly fluidly connected to the second distributor valve; and as regards the second distributor valve, one port is directly fluidly connected to the first distributor valve, one port is directly fluidly connected to a waste, one port is directly fluidly connected to a first solvent reservoir and one port is directly fluidly connected to the metering device.

In this document, a fluid connection (or two elements being fluidly connected to one another) means that fluid may flow from one element to another. A port of a valve being directly fluidly connected to another element should be construed to mean that the port is fluidly connected to the other element in such a manner that there is no other valve port interposed between the port of the valve and the other element.

Another port of the second distributor valve may be directly fluidly connected to a second solvent reservoir.

The sample pick up means may be a needle.

The liquid chromatography system may comprise a pressure sensor and the method may comprise the step of the pressure sensor sensing a pressure. This may allow for a particularly controlled pressurization (and optionally also depressurization) of the trap column.

The pressure sensor may be fluidly connected to the metering device.

The pressure sensor may be arranged between the metering device and the second distributor valve.

The present invention also relates to a separation method of separating constituents of a sample. The separation method comprises the method of introducing a sample into a separation column discussed herein and the separation method also comprises separating constituents of the sample in the separation column at an analytical pressure, wherein the first pressure is at least 10% of the maximum analytical pressure, preferably at least 50%, more preferably at least 90% of the maximum analytical pressure.

The present invention also relates to a liquid chromatography system. The system comprises a sample pick up means, a metering device fluidly connected to the sample pick up means, a seat for receiving the sample pick up means, a trap column, a separation column, an analytical pump, a first distributor valve comprising a plurality of ports and a plurality of connecting elements for changeably connecting the ports of the first distributor valve, wherein one port is directly fluidly connected to the seat, two ports are directly fluidly connected to the trap column, one port is directly fluidly connected to the separation column, one port is directly fluidly connected to the analytical pump, wherein the system is adapted to assume a configuration, wherein the trap column is isolated from ambient atmosphere and is pressurized to a trap column pressure exceeding ambient pressure without the trap column being fluidly connected to the separation column. Again, this may have benefits corresponding to the ones described above with regard to the method.

The configuration may also be defined by the trap column being pressurized to the trap column pressure exceeding ambient pressure without the trap column being fluidly connected to the analytical pump.

The trap column pressure may exceed ambient pressure by at least 10 bar, preferably by at least 100 bar, more preferably by at least 1000 bar, such as by at least 1500 bar.

The configuration may also be defined by the metering device being fluidly connected to the trap column.

The system may further comprise a waste, a first solvent reservoir, a second distributor valve, which second distributor valve comprises a plurality of ports and a plurality of connecting elements for changeably connecting the ports of the second distributor valve, wherein one port of the second distributor valve is directly fluidly connected to the first distributor valve, one port of the second distributor valve is directly fluidly connected to the waste, one port of the second distributor valve is directly fluidly connected to the first solvent reservoir and one port of the second distributor valve is directly fluidly connected to the metering device.

The system may further comprise a second solvent reservoir and another port of the second distributor valve may be directly fluidly connected to the second solvent reservoir.

The metering device may comprise a first port and a second port, wherein the first port is directly fluidly connected to the sample pick up means and the second port is directly fluidly connected to a port of the second distributor valve.

The system may further comprise a pressure sensor.

The pressure sensor may be fluidly connected to the metering device.

The pressure sensor may be located between the metering device and the second distributor valve.

The invention is also defined by the following numbered embodiments.

In embodiment one, a method of introducing a sample into a separation column, the method comprising introducing the sample into a trap column, isolating the trap column from ambient atmosphere and pressurizing the trap column to a first pressure while the trap column is isolated from ambient atmosphere, providing a fluid connection between the trap column and the separation column after pressurizing the trap column to the first pressure, supplying the sample from the trap column to the separation column.

It will be understood that the sample may be a liquid sample. As will further be understood, when the sample is introduced into the trap column, some constituents of the sample will adhere to the trap column while other constituents may not adhere and may flow through the trap column and go to waste (which may also be referred to as a waste reservoir). That is, the sample being introduced and adhering to the trap column does not necessarily have exactly the same composition as the original sample. The same applies to the sample which is supplied from the trap column to the separation column. E.g., depending on the type of solvent used, only some constituents of the sample adhering to the trap column may be introduced to the separation column. For sake of brevity and simplicity of description, however, all of the above will simply be referred to as "the sample"—although it is clear to the skilled person that the sample originally introduced into a system carrying out the described method does not necessarily correspond to 100% to the sample that is supplied to the separation column and subsequently analyzed.

In embodiment two, a method in accordance with the preceding embodiment, wherein the first pressure exceeds the ambient pressure by at least 10 bar, preferably by at least 100 bar, more preferably by at least 1000 bar, such as by at least 1500 bar.

In embodiment three, a method in accordance with any of the preceding embodiments, wherein the method is carried out by a liquid chromatography system.

In embodiment four, a method in accordance with the preceding embodiment, wherein the liquid chromatography system comprises an analytical pump adapted to provide a flow of pressurized fluid.

In embodiment five, a method in accordance with the preceding embodiment, wherein the method also comprises providing a fluid connection between the trap column and the analytical pump, wherein the fluid connection between the trap column and the analytical pump is provided simultaneously with providing the fluid connection between the trap column and the separation column.

In embodiment six, a method in accordance with any of the preceding embodiments with the features of embodiment 3, wherein the liquid chromatography system comprises a metering device.

In embodiment seven, a method in accordance with the preceding embodiment, wherein introducing the sample into the trap column comprises the metering device causing a volume of the sample to be sucked into the liquid chromatography system and wherein the metering device pressurizes the trap column to the first pressure.

In embodiment eight, a method in accordance with any of the preceding embodiments with the features of embodiment 6, wherein the metering device comprises a first port and a second port for fluidly connecting the metering device to other components and wherein preferably each of these ports can selectively be opened and closed.

In embodiment nine, a method in accordance with any of the preceding embodiments with the features of embodiment 3, wherein the liquid chromatography system comprises a sample pick up means, a seat to receive the sample pick up means and a first distribution valve.

In embodiment ten, a method in accordance with the preceding embodiment, wherein introducing the sample into the trap column comprises the sample pick up means being moved to a sample reservoir, the sample being sucked into the sample pick up means and optionally into a tubing section adjacent to the sample pick up means, the sample pick up means being moved to the seat, the first distribution valve being set to provide a fluid connection between the seat and the trap column, the sample being introduced into the trap column.

In embodiment eleven, a method in accordance with the preceding embodiment and with the features of embodiment 6, wherein the sample being introduced into the trap column is done by means of the metering device.

In embodiment twelve, a method in accordance with any of the preceding embodiments with the features of embodiment 8, wherein the method comprises a solvent being introduced into the metering device through the first port before the sample is introduced into the trap column, and wherein introducing the sample into the trap column comprises the solvent being expelled from the metering device through the second port.

In embodiment thirteen, a method in accordance with any of the preceding embodiments with the features of embodiment 8, wherein the method comprises a solvent being introduced into the metering device through the first port after the sample is introduced into the trap column, and expelling the solvent from the metering device through the second port.

In embodiment fourteen, a method in accordance with any of the preceding embodiments, wherein, when introducing the sample into the trap column, the sample enters the trap column in a first flow direction, and wherein, when supplying the sample from the trap column to the separation column, the sample leaves the trap column in a second flow direction, which second flow direction is opposite to the first flow direction.

In embodiment fifteen, a method in accordance with any of the preceding embodiments without the features of the preceding embodiment, wherein, when introducing the sample into the trap column, the sample enters the trap column in a first flow direction, and wherein, when supplying the sample from the trap column to the separation column, the sample leaves the trap column in the first flow direction.

In embodiment sixteen, a method in accordance with any of the preceding embodiments, wherein the method comprises depressurizing the trap column after supplying the sample from the trap column to the separation column.

In embodiment seventeen, a method in accordance with the preceding embodiment and with the features of embodiment 6, wherein the metering device depressurizes the trap column.

In embodiment eighteen, a method in accordance with any of the preceding embodiments with the features of embodiment 3, wherein the liquid chromatography system comprises a waste.

In embodiment nineteen, a method in accordance with the preceding embodiment, wherein the method comprises fluidly connecting the trap column to the waste and supplying fluid from the trap column to the waste, wherein the trap column and the waste are fluidly connected after the sample is supplied from the trap column to the separation column.

In embodiment twenty, a method in accordance with any of the preceding embodiments with the features of embodiments 16 and 19, wherein the trap column and the waste are fluidly connected after the trap column is depressurized.

In embodiment twenty-one, a method in accordance with any of the two preceding embodiments with the features of embodiments 6 and 8, wherein the method comprises solvent being introduced into the metering device through the first port and solvent being expelled from the metering device through the second port after fluidly connecting the trap column to the waste.

In embodiment twenty-two, a method in accordance with any of the preceding embodiments with the features of embodiments 4, 6 and 9, wherein the liquid chromatography system further comprises a second distributor valve, wherein each distributor valve comprises a plurality of ports and a plurality of connecting elements for changeably connecting the ports of the respective distributor valve, wherein as regards the first distributor valve, one port is directly fluidly connected to the seat, two ports are directly fluidly connected to the trap column, one port is directly fluidly connected to the separation column, one port is directly fluidly connected to the analytical pump and one port is directly fluidly connected to the second distributor valve; and as regards the second distributor valve, one port is directly fluidly connected to the first distributor valve, one port is directly fluidly connected to a waste, one port is directly fluidly connected to a first solvent reservoir and one port is directly fluidly connected to the metering device.

In this document, a fluid connection (or two elements being fluidly connected to one another) means that fluid may flow from one element to another. A port of a valve being directly fluidly connected to another element should be construed to mean that the port is fluidly connected to the other element in such a manner that there is no other valve port interposed between the port of the valve and the other element.

In embodiment twenty-three, a method in accordance with the preceding embodiment, wherein another port of the second distributor valve is directly fluidly connected to a second solvent reservoir.

In embodiment twenty-four, a method in accordance with any of the preceding embodiments with the features of embodiment 9, wherein the sample pick up means is a needle.

In embodiment twenty-five, a method in accordance with any of the preceding embodiments with the features of embodiment 3, wherein the liquid chromatography system comprises a pressure sensor and wherein the method comprises the step of the pressure sensor sensing a pressure.

In embodiment twenty-six, a method in accordance with the preceding embodiment and with the features of embodiment 6, wherein the pressure sensor is fluidly connected to the metering device.

In embodiment twenty-seven, a method in accordance with any of the two preceding embodiments and with the features of embodiment 22, wherein the pressure sensor is arranged between the metering device and the second distributor valve.

In embodiment twenty-eight, a separation method of separating constituents of a sample, wherein the separation method comprises the method of introducing a sample into a separation column in accordance with any of the preceding embodiments and wherein the separation method also comprises separating constituents of the sample in the separation column at an analytical pressure, wherein the first pressure is at least 10% of the maximum analytical pressure, preferably at least 50%, more preferably at least 90% of the maximum analytical pressure.

Below, system embodiments will be discussed. These embodiments are abbreviated by the letter "S" followed by a number. When reference is herein made to a system embodiment, those embodiments are meant.

In system embodiment one, a liquid chromatography system comprising a sample pick up means, a metering device fluidly connected to the sample pick up means, a seat for receiving the sample pick up means, a trap column, a separation column, an analytical pump, a first distributor valve comprising a plurality of ports and a plurality of connecting elements for changeably connecting the ports of the first distributor valve, wherein one port is directly fluidly connected to the seat, two ports are directly fluidly connected to the trap column, one port is directly fluidly connected to the separation column, one port is directly fluidly connected to the analytical pump, wherein the system is adapted to assume a configuration, wherein the trap column is isolated from ambient atmosphere and is pressurized to a trap column pressure exceeding ambient pressure without the trap column being fluidly connected to the separation column.

In system embodiment two, a liquid chromatography system according to the preceding embodiment, wherein the configuration is also defined by the trap column being pressurized to the trap column pressure exceeding ambient pressure without the trap column being fluidly connected to the analytical pump.

In system embodiment three, a liquid chromatography system according to any of the preceding system embodiments, wherein the trap column pressure exceeds ambient pressure by at least 1 bar, preferably by at least 10 bar, more preferably by at least 100 bar, such as by at least 500 bar.

In system embodiment four, a liquid chromatography system according to any of the preceding system embodiments, wherein the configuration is also defined by the metering device being fluidly connected to the trap column.

In system embodiment five, a liquid chromatography system according to any of the preceding system embodiments, wherein the system further comprises a waste, a first solvent reservoir, a second distributor valve, which second distributor valve comprises a plurality of ports and a plurality of connecting elements for changeably connecting the ports of the second distributor valve, wherein one port of the second distributor valve is directly fluidly connected to the first distributor valve, one port of the second distributor valve is directly fluidly connected to the waste, one port of the second distributor valve is directly fluidly connected to the first solvent reservoir and one port of the second distributor valve is directly fluidly connected to the metering device.

In system embodiment six, a liquid chromatography system according to the preceding embodiment, wherein the system further comprises a second solvent reservoir and wherein another port of the second distributor valve is directly fluidly connected to the second solvent reservoir.

In system embodiment seven, a liquid chromatography system according to any of the preceding system embodiments with the features of embodiments S5, wherein the metering device comprises a first port and a second port, wherein the first port is directly fluidly connected to the sample pick up means and the second port is directly fluidly connected to a port of the second distributor valve.

In system embodiment eight, a liquid chromatography system according to any of the preceding system embodiments, wherein the system further comprises a pressure sensor.

In system embodiment nine, a liquid chromatography system according to the preceding embodiment, wherein the pressure sensor is fluidly connected to the metering device.

In system embodiment ten, a liquid chromatography system according to any of the preceding two embodiments and with the features of embodiment S5, wherein the pressure sensor is located between the metering device and the second distributor valve.

BRIEF DESCRIPTIONS OF DRAWINGS

The present invention will now be described with reference to the accompanying drawings which illustrate embodiments of the invention, without limiting the scope of the invention.

It is noted that not all of the drawings carry all the reference signs. Instead, in some of the drawings, some of the reference signs have been omitted for sake of brevity and simplicity of illustration.

DETAILED DESCRIPTIONS OF EMBODIMENTS

Figure 1:
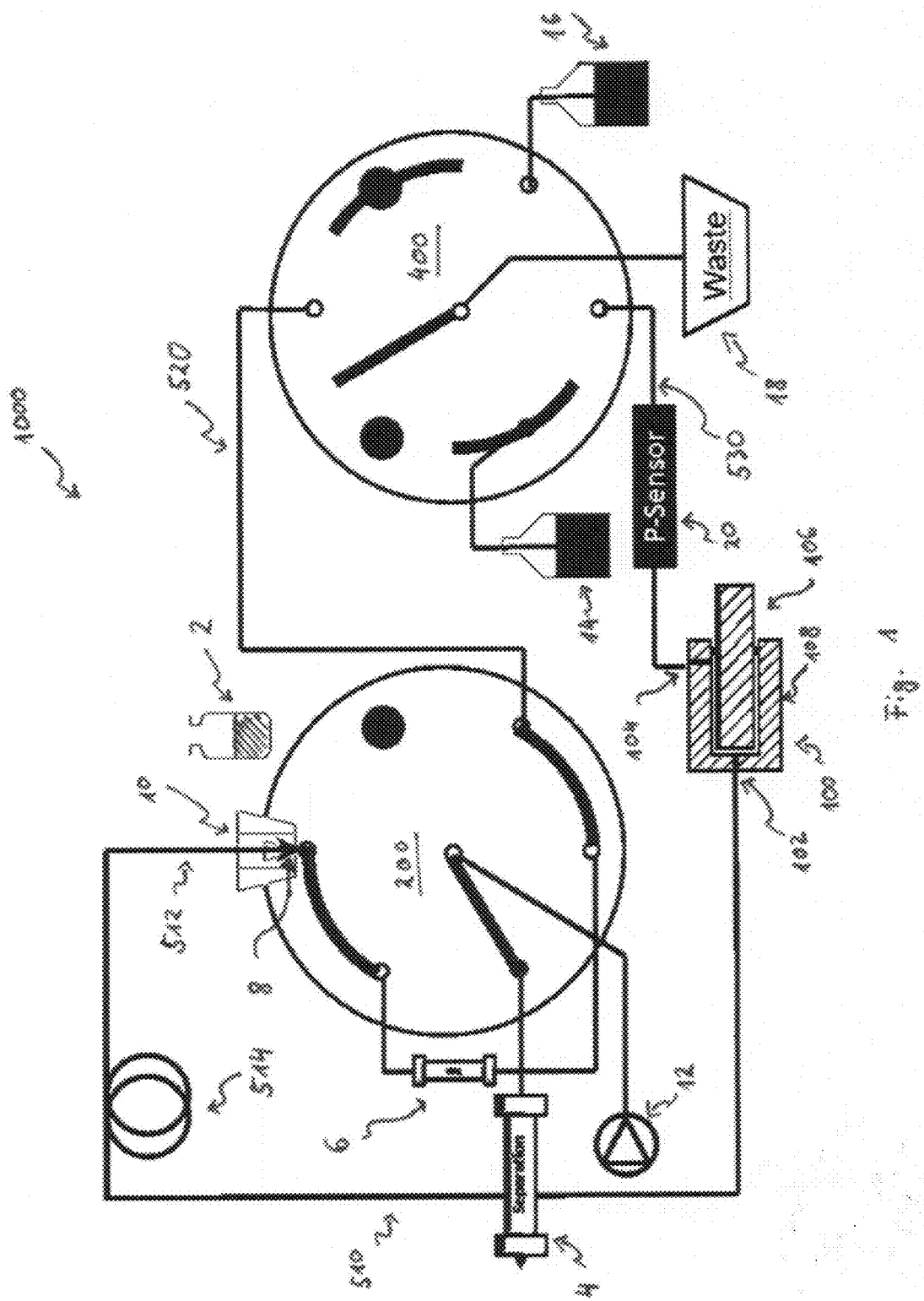
FIG. 1 depicts a liquid chromatography system of a first embodiment according to the present invention in a first configuration.

FIG. 1 schematically depicts a liquid chromatography ("LC") system 1000 in accordance with an embodiment of the present technology. In particular, the liquid chromatography system 1000 can be a high pressure liquid chromatography system 1000 (also referred to as a high performance liquid chromatography system 1000 or abbreviated HPLC system), that is a system adapted to be employed with pressures exceeding 100 bar, preferably exceeding 1.000 bar, such as 1.500 bar. To perform a LC, in essence, a sample contained in a sample container or sample reservoir 2 has to be transferred into a separation column 4. Different constituents of the sample adhere differently to the separation column 4. Thus, when an analytical pump 12 causes the sample to flow through the separation column 4, the different constituents of the sample will leave the separation column 4 at different times, allowing the constituents to be subsequently detected.

The present technology is particularly directed to introducing the sample into the separation column 4. In essence, this is achieved by a sample pick up means 8 (such as a needle 8) of the LC system 1000 being inserted into the sample reservoir 2 (see FIG. 4) and a suction being supplied to a tubing 510 connecting the needle 8 and a metering device 100. Such suction can be supplied to said tubing 510 by a piston 106 of the metering device 100 retracting out of a housing 108 of the metering device 100. Thus, a sample can be sucked from the sample reservoir 2 into the needle 8. It may also be sucked into a tubing end section 512, which tubing end section 512 is adjacent to the needle 8. The tubing end section 512 may also be referred to as sample loop 512. The needle 8 can subsequently be seated into a seat 10 which will also be referred to as a needle seat 10 (see FIG. 5), and the sample can be pushed onto a trap column 6 by the piston 106 of the metering device 100 being moved forward. By switching a distributor valve 200 into an appropriate position (see the alternatives of FIGS. 7a and 7b), the trap column 6 can be fluidly connected to the separation column 4. In such a state, the analytical pump 12 can cause the sample to flow from the trap column 6 to the separation column 12.

In the above, the general setup of one embodiment of the present technology has been described. The described trap column 6 may be of some relevance for the present technology. The trap column 6 is used to preconcentrate the sample: Instead of injecting the sample directly into the separation column, the sample is first guided to the trap column 6, where the constituents to be analyzed may adhere. These constituents may then be separated for further assessment by an appropriate fluid being pumped through the trap column 6 by means of the analytical pump 12. It will be understood that when introducing the sample from the trap column 6 into the separation column 4, the sample and the section of the system 1000 being fluidly connected to the separation column 4 will be at analytical pressure, i.e. at the pressure at which the separation is performed. As discussed, this may be a pressure of several hundred bar, or even a pressure exceeding 1.000 bar. It will be understood that after the sample has been introduced into the trap column 6 (see FIG. 5), the trap column 6 is typically not yet at the analytical pressure. Instead, in this state (see FIG. 5), the section of the system 1000 being fluidly connected to the trap column 6 comprises the following: metering device 100, tubing 510 connecting the metering device 100 to the needle 8, needle 8, trap column 6, tubing 520 connecting distributor valves 200 and 400 and waste 18. In this section and in this state or configuration, there may be atmospheric or ambient pressure, i.e. a pressure sufficiently below the analytical pressure.

Figure 7A:
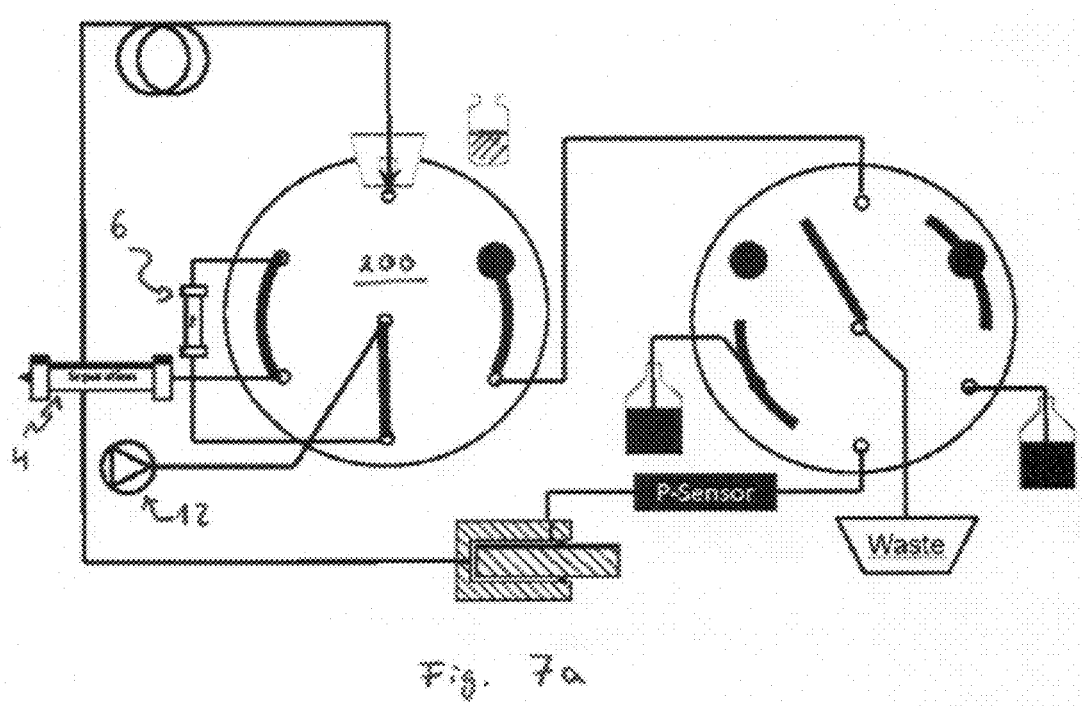
FIG. 7a depicts the system of FIG. 1 in a sixth configuration (which may be referred to as the "backward flush injection state")
Figure 7B:
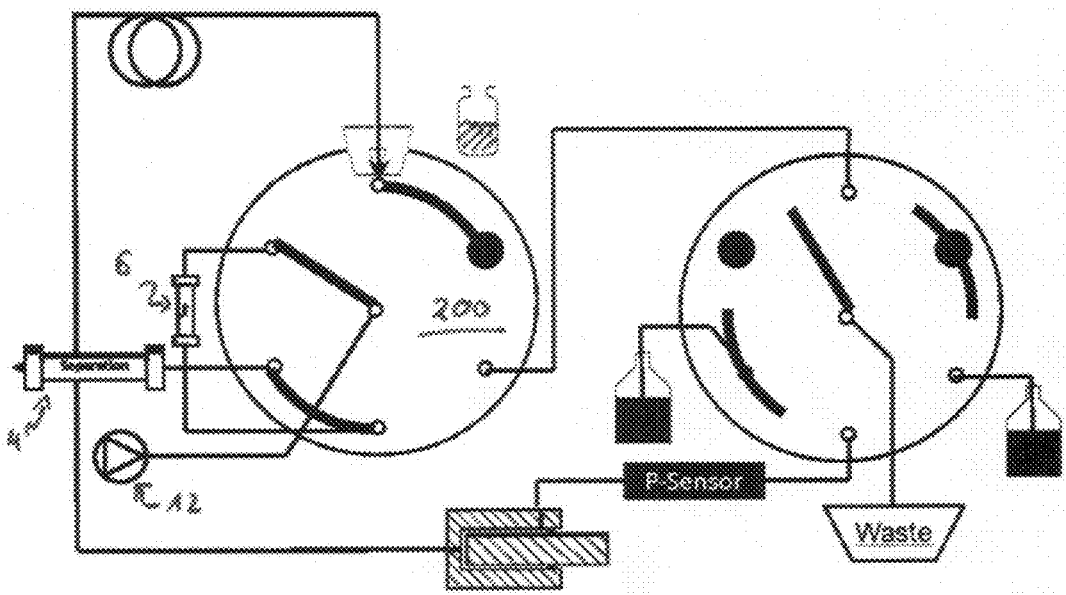
FIG. 7b depicts the system of FIG. 1 in a seventh configuration (which may be referred to as the "forward flush injection state")

In principle, after the sample has been transferred into the trap column 6 (see FIG. 5) and onto the material in the trap column 6, one could immediately switch the system 1000 to one of the states depicted in FIGS. 7*a* and 7*b*, that is to a state where the sample is transferred from the trap column 6 to the separation column 4. Thus, the pump 12 would have to bring the trap column 6 and the separation column 4 to the analytical pressure.

However, in the depicted embodiment of the present technology, the trap column 6 is pressurized before it is fluidly connected to the separation column 4. This is depicted in FIG. 6. Here, the section of the system 1000 being fluidly connected to the trap column 6 comprises the following: metering device 100, tubing 510 connecting the metering device 100 to the needle 8, needle 8, trap column 6, tubing 520 connecting distributor valves 200 and 400. However, in contrast to the configuration depicted in FIG. 5, the tubing 520 is not connected to the waste 18. Instead, the distributor valve 400 is set such that tubing 520 includes a "dead end". Put differently, trap column 6 is connected to dead ends at both sides. Put differently still, trap column 6 is isolated from the ambient atmosphere. In this state, the piston 106 of the metering device 100 may be moved forward to pressurize the section of the system 1000 being fluidly connected to the trap column 6 and hence also the trap column 6. Thus, this section may be brought to an elevated pressure and particularly to the analytical pressure before the trap column 6 is fluidly connected to the separation column 4. This may be advantageous for various reasons: The trap column 6 may be brought to an elevated pressure (e.g., to the analytical pressure) in a controlled manner, thereby preventing pressure spikes at the trap column 6 that could occur otherwise and that could damage the trap column. Further, the separation column 4 can be maintained at elevated pressures (e.g., at the analytical pressure). That is, instead of having to pressurize both the trap column 6 and the separation column 4 after these two columns have been fluidly connected to one another, the trap column 6 is connected to the separation column 4 when both of them are pressurized. This also prevents the separation column 4 from being subjected to pressure alterations and pressure spikes. This may reduce the wear on the components and increase the lifetime of the components and the overall system. Further, not having pressure spikes also reduced the likelihood of the sample being mixed with solvent, i.e., dispersion. Having a less dispersed sample leads to a more defined peak in subsequent analysis, thereby resulting in an improved analysis.

FIG. 1 also depicts blind plugs 230, 430. In the embodiments depicted in FIG. 1, valve 200 comprises one bling plug 230 and valve 400 comprises two blind plugs 430. Blind plugs 230, 430 may be used to close off ports in the distributor valves 200, 400. Thus, the distributor valves 200, 400 may be identical to one another (and only differ by the use of the blind plugs 230, 430), which may simplify the productions process. More particularly, in the embodiment depicted in FIG. 1, each distribution valve 200, 400 comprises 7 ports, however, two ports of the right distribution valve 400 and one port of the left distribution valve 200 are closed off by the discussed bling plugs 230, 430.

The system 1000 may also comprise a pressure sensor 20. The pressure sensor 20 may be fluidly connected to the metering device 100 (e.g., it may be disposed between metering device 100 and the second switching valve 400). Thus, when precompressing a section of the system 1000 (as discussed), one may monitor the pressure in this section— e.g., to bring this pressure to the analytical pressure. The sensor 20 may also be used for monitoring the decompression of a section of the system.

Figure 2:
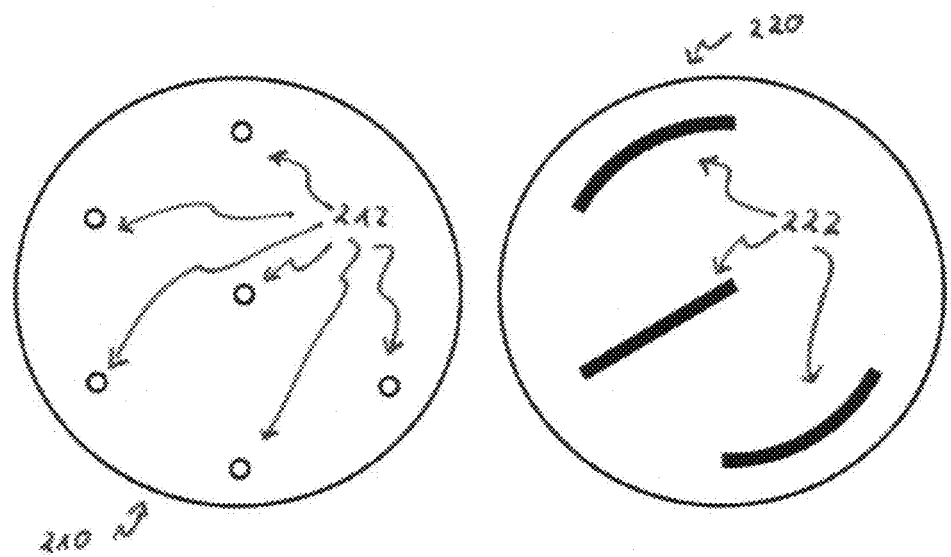
FIG. 2 depicts components of a distributor valve employed in embodiments of the present invention.

The embodiment of the present technology depicted in the Figures will now be described in greater detail. FIG. 1 depicts the liquid chromatography system 1000. The system comprises a sample reservoir 2 including a sample to be analyzed, a trap column 6, a separation column 4, an analytical pump 12, a metering device 100, a sample pick up means 8 (which is here realized as a needle 8), a seat 10 (which is here realized as a needle seat 10), solvent reservoirs 14, 16, a waste 18, tubing interconnecting different elements of the system 1000, as well as two distributor valves 200, 400. The distributor valves 200, 400 can be set to different states to switch the connection between different elements. One exemplary realization of a distributor valve 200 is depicted in FIG. 2. Each distributor valve 200 may comprise a stator 210 and a rotor 220. The stator 210 may comprise ports 212 to which different elements may be connected (e.g., in the embodiment depicted in FIG. 1, each of the needle 8, the analytical pump 12, the separation column 4 and the tubing 520 to the other distribution valve 400 is fluidly connected to one port of the distributor valve 200, respectively, and the trap column 6 is fluidly connected to two ports of this distributor valve 200). The rotor 220 may comprise connecting elements 222, such as grooves 222, that may interconnect different ports 212 of the stator element 210. For example, FIG. 1 depicts a configuration where each connecting element 222 of the rotor of the left distribution valve 200 interconnects two ports of said distribution valve, respectively, while the stator and the rotor of the second distribution valve 400 are in such a configuration that none of the ports in the second distribution valve are connected to one another. It will be understood that whenever two elements are described to be connected to one another, this denotes a fluid connection, i.e., a connection where a fluid may flow from one element to the other, unless otherwise specified or unless clear to the skilled person that something different is meant.

In FIG. 1, the system or setup 1000 in an idle position: flow of the analytical pump 12 is passed through the first valve 200 directly to the separation column 4. The needle 8 is in the needle seat 10. The right valve 400, which valve 400 is responsible for the selection of trap fluids and for providing the Compress position, is set here to "Compress". That is, the valve 400 is set such that the tubing section 520 connecting the first valve 200 to the second valve 400 includes a "dead end".

Figure 3:
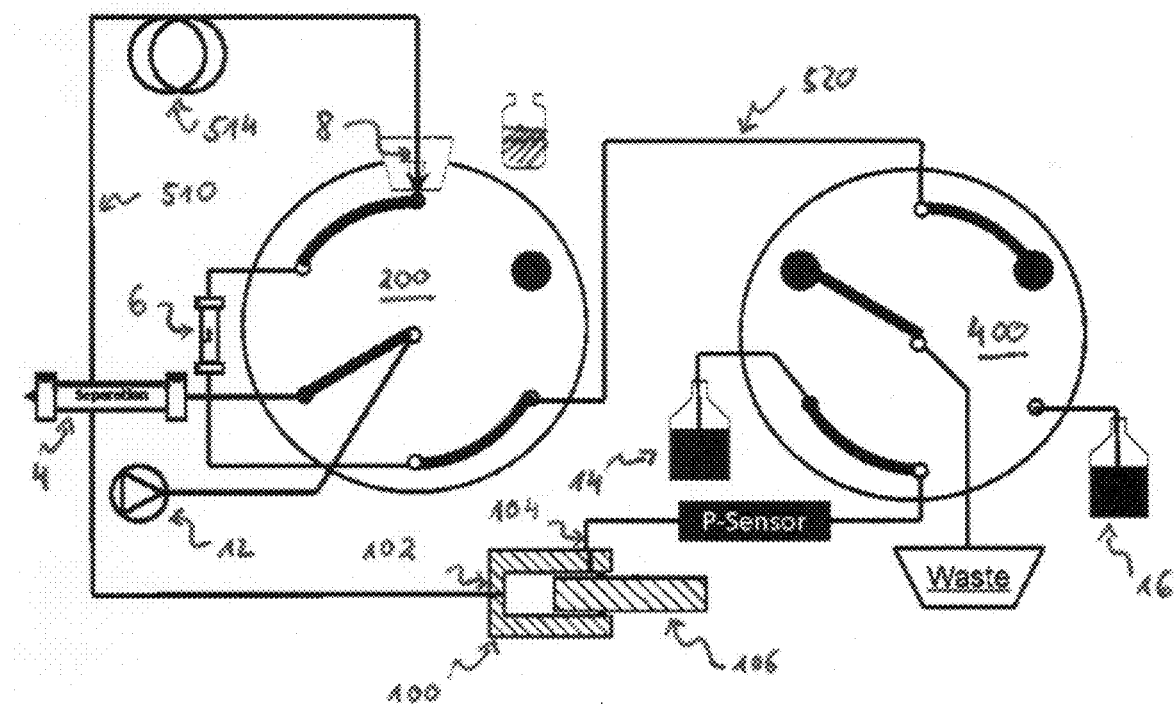
FIG. 3 depicts the system of FIG. 1 in a second configuration (which may be referred to as the "idle state")

FIG. 3 depicts how the metering device 100 may get filled with a first portion of trap solvent. The metering device 100 has two connection ports 102, 104, which are also referred to as first connection port 104 and second connection port 102. The right valve 400 connects port 102 of the metering device 100 (which port 102 may also be referred to as an input) with a solvent reservoir 14. The other side, i.e., the other connection port 104 of the metering device 100 is closed over the tubing 510 connecting the metering device 100 and the needle 8, which tubing 510 may include a buffer loop 514, the needle seat 10, the trap column 6, the first valve 200, tubing 520 and the second valve 400. The buffer loop 514 may provide an additional length of tubing to allow movement of the needle 8. In the depicted position, the piston 106 of the metering device 100 can pull back while raising solvent from solvent reservoir 14. It is noted that valve 2 may also be switched to such a position that, instead, solvent may be supplied from solvent reservoir 16 to the metering device 100. That is, in simple words, FIG. 3 depicts a configuration where trap solvent may be supplied to the metering device 100 from solvent reservoir 14. Furthermore, there may also be a fluid flow from the analytical pump 12 through the separation column in this configuration.

Figure 4:
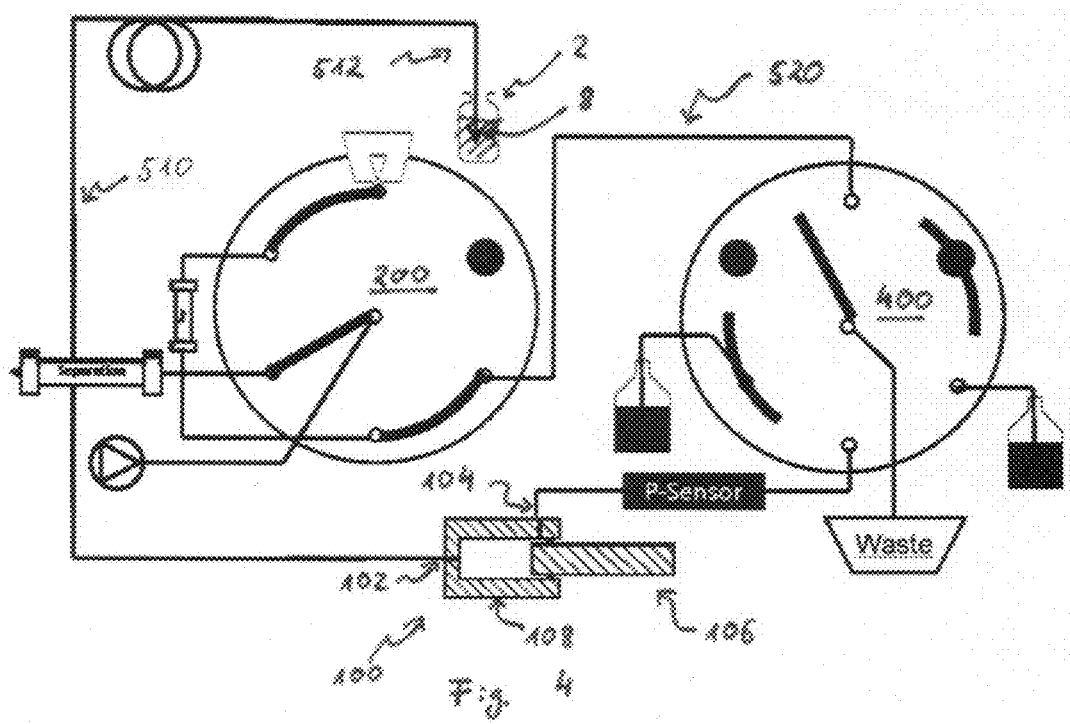
FIG. 4 depicts the system of FIG. 1 in a third configuration (which may be referred to as the "sample pick up state")

FIG. 4 depicts a configuration where the right valve 400 again enters the compress position, i.e., the state where the metering device 100 is closed at port 104, i.e. where this port 104 is connected to a dead end. More particularly, in the configuration depicted in FIG. 4, the tubing 520 interconnecting the valves 200 and 400 includes a dead end. The metering device 100 is first closed at both ports 102, 104, or, in other words, in the front and in the back—that is, both ports 102, 104 are connected to "dead ends". The needle 2 may be moved to the sample reservoir 2 and the port 102 of the metering device 100, which port 102 connects the metering device to the tubing 510, may be opened—i.e. the tubing 510 does no longer lead to a dead end, but to sample reservoir 2. That is, the metering device 100 may be opened via the buffer loop 514. As the piston 106 of the metering device 100 moves back, the sample is drawn up into needle 8 and optionally also into the tubing section 512 adjacent to the needle 8.

Figure 5:
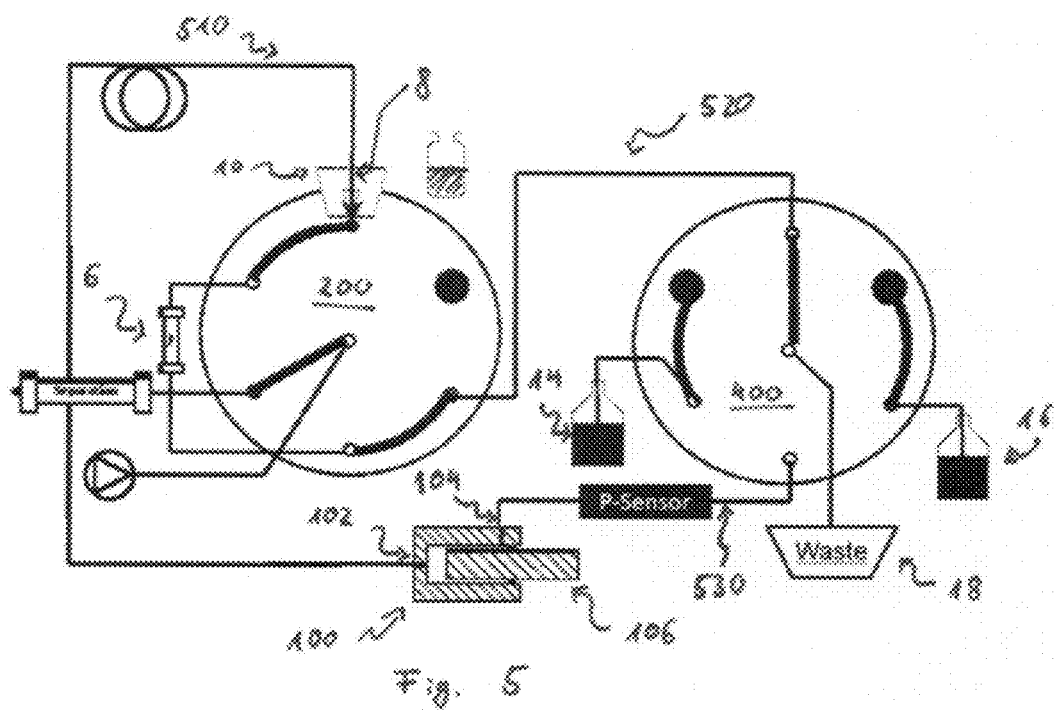
FIG. 5 depicts the system of FIG. 1 in a fourth configuration (which may be referred to as the "trapping state")
Figure 6:
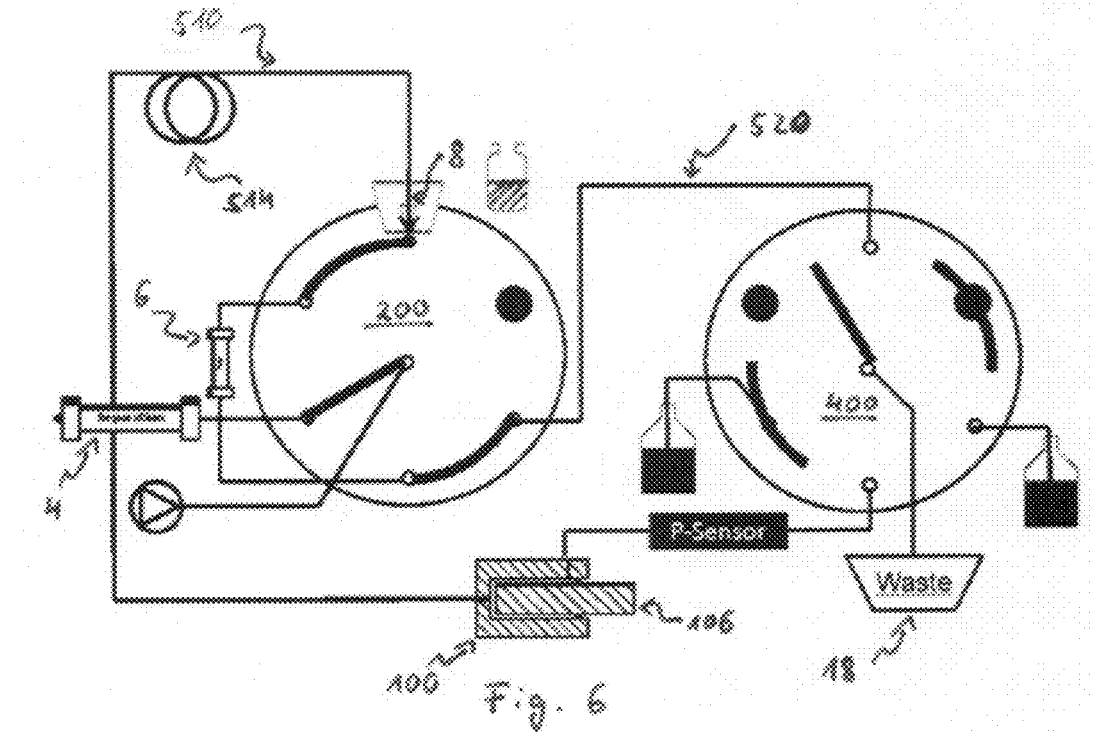
FIG. 6 depicts the system of FIG. 1 in a fifth configuration (which may be referred to as the "pre-pressurize state")

FIG. 5 depicts how after the sample is drawn, the needle 8 returns to the needle seat 10. The right valve 400 connects a side of the trap column 6 facing away from the sample with the waste 18. In this position, the piston 106 of the metering device 100 can move forward and therefore push the sample with the previously raised trap solvent to the trap column 6. Components which do not adhere to the trap column 6 get pushed out to waste 18. This process may be repeated if the right valve 400 again connects the port 104 (which may also be referred to as the rear output) of the metering device 100 with the solvent reservoirs 14 or 16 and therefore allows the metering device 100 to raise fresh trap solvent. That is, more trap solvent may be introduced into the section of the system fluidly connected to the trap column 6 in FIG. 5. To do so, valve 400 is moved to connect tubing 530 to solvent reservoir 14 or 16 (that is the configuration of valve 400 in FIG. 3), thereby "opening" port 104, which is no longer connected to a dead end, and port 102 of metering device 100 is "closed" (i.e., it is connected to a dead end). When the piston 106 is moved back in such a configuration, solvent is drawn from the solvent reservoir 14 (or 16) into the metering device 100. Subsequently, port 104 can be closed (i.e., connected to a dead end) and port 102 be opened (i.e., not connected to a dead end). Then, piston 106 may be moved forward to supply the solvent into tubing section 510 to thereby supply more solvent (and potentially also more sample if there are any residues in the tubing) towards the trap column 6. This process may also be referred to as trapping (and retrapping) the sample.

FIG. 6 depicts the configuration where the sample that has been trapped on the trap column 6 and the components that are fluidly connected to the trap column 6 are pressurized (or "precompressed"). The right valve 400 switches back to the compress position, i.e., to the position where tubing 520 has a dead end. The piston 106 in the metering device 100 moves forward, such that volume in the tubing 510 (which includes the buffer loop 514), the trap column 6, the metering device 106 and the connections is compressed. It can be compressed until analytical pressure is reached. By this step, the sample in the trap column 6 may be brought to an elevated pressure, such as to the analytical pressure.

The trap column 6 may now be fluidly connected to the analytical pump 12 on one side and to the separation column 4 on the other side. This may be done in different ways, depicted in FIGS. 7a and 7b, respectively.

FIG. 7a depicts a configuration, which may be referred to as the "backward flush" configuration. The left valve 200 is switched such that the trap column 6 is introduced into the analytical flow in such a way that the analytical flow pushes the sample back out the side it came from (backward flush). That is, the flow direction through the trap column 6 is opposite to the flow direction with which the trap column 6 was supplied with the sample. Put differently, a first end of the trap column 6 that has been upstream to a second end of the trap column 6 when being provided with the sample is now downstream to this second end when the analytical flow is provided through the trap column 6.

Alternatively, as depicted in FIG. 7b, the analytical flow can push the sample further in the direction of the trap flow (forward flush). That is, the flow direction through the trap column 6 is parallel to the flow direction with which the trap column 6 was supplied with the sample. Put differently, a first end of the trap column 6 that has been upstream to a second end of the trap column 6 when being provided with the sample is now also upstream to this second end when the analytical flow is provided through the trap column 6.

Figure 8:
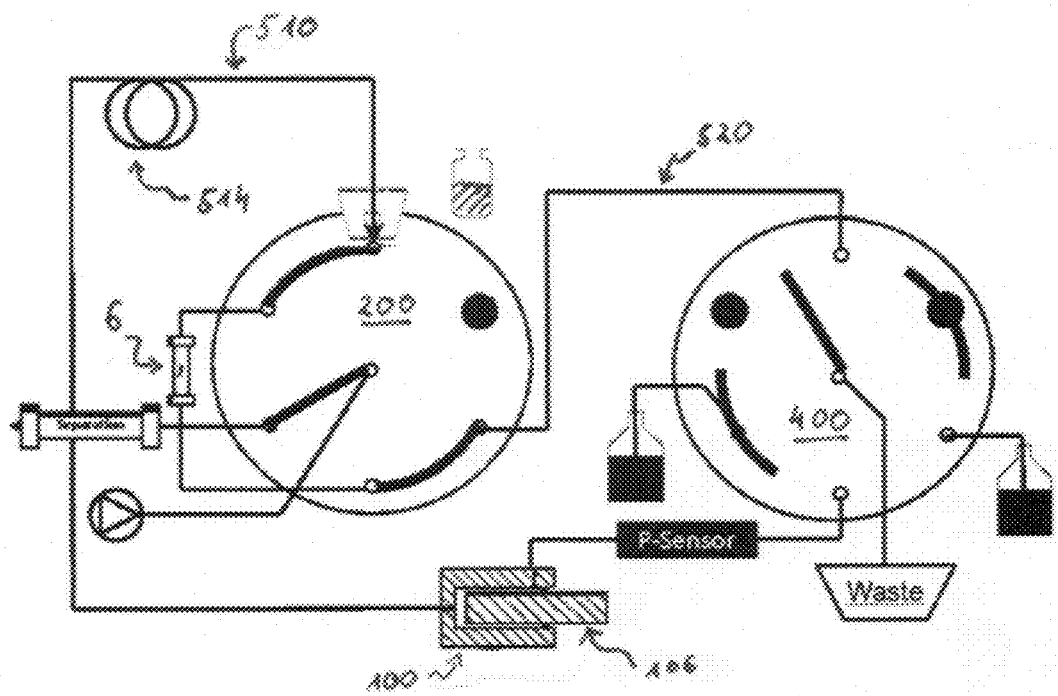
FIG. 8 depicts the system of FIG. 1 in an eighth configuration (which may be referred to as the "de-pressurize state")

FIG. 8 depicts a configuration similar to the configuration depicted in FIG. 6. Again, the trap column 6 is fluidly connected to the tubing 520 connecting valves 200 and 400 and to the tubing 510 (including the buffer loop 514) providing a connection to the metering device 100. By moving the piston 106 back, the pressure still present in the portion of the system 1000 fluidly connected to the trap column 6 (including the buffer loop 514, the metering device 100 and the connections) can be reduced. That is, this configuration may also be referred to as the decompress state. The controlled decompression may be advantageous for different reasons. By means of the controlled decompression, no uncontrolled and more rapid decompression occurs. Thus, the controlled decompression leads to less abrasion on the valve 200 and other components and also prevents fluid from rapidly exiting the system (which could be a risk for a user). Furthermore, the controlled decompression also lowers the risk of components outgassing in the fluid in the system.

Figure 9:
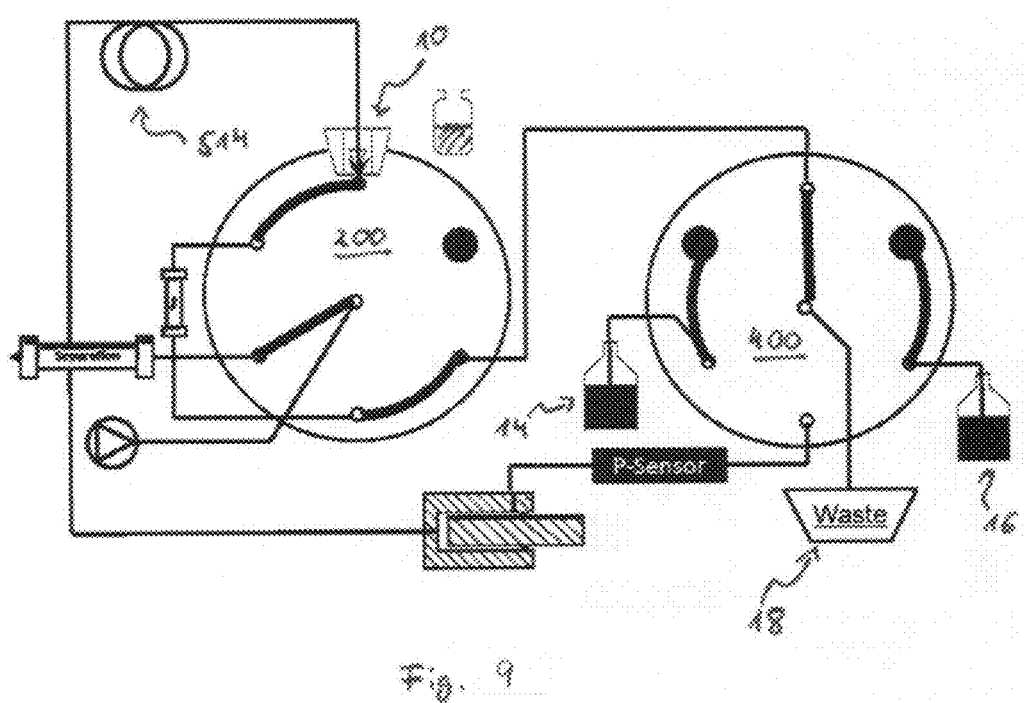
FIG. 9 depicts the system of FIG. 1 in a ninth configuration (which may be referred to as the "washing state").

FIG. 9 depicts a configuration where the trap column 6 is fluidly connected to the waste 18. In this state, if any residual pressure remains in the trap column 6 and the components fluidly connected thereto, it can be dissipated. That is, in comparison to FIG. 8, the right valve 400 can be switched to waste 18. This state may also be referred to as the equilibrium phase. The right valve 200 can reconnect the metering device 100 with solvent reservoir 14 or 16 from this position, draw up the respective solvent, and thus wash the trap column 6 and components fluidly connected thereto (including the buffer loop 514, the needle seat 10 and the trap column 6). That is, the metering device 100 may also be used to wash the system 1000. The washing is typically done iteratively with the configurations depicted in FIGS. 3 and 9. That is, the left valve 200 remains in one position and the right valve is iteratively switched. In the state depicted in FIG. 3, solvent may be drawn into the metering device and in the state depicted in FIG. 9, the components fluidly connected to the metering device 100 (also including the trap column 6) may be washed. Furthermore, it will be understood that washing an equilibrating may be performed simultaneously. Equilibrating may be done by means of the first (left) valve 200 by having the analytical pump 12 fluidly connected with the separation column 4 (i.e., valve 200 may not be switched when equilibrating) and the second (right) valve 400 being iteratively switched, as discussed.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment was provided for illustrative purpose only and should by no means be construed to limit the scope of the present invention, which is defined by the claims.

What is claimed is:

1. A method of introducing a sample into a separation column, the method comprising:
   introducing the sample into a trap column;
   isolating the trap column from an ambient atmosphere and pressurizing the trap column to a first pressure while the trap column is isolated from the ambient atmosphere;
   providing a fluid connection between the trap column and the separation column after pressurizing the trap column to the first pressure; and
   supplying the sample from the trap column to the separation column,
   wherein the method is carried out by a liquid chromatography system, the liquid chromatography system comprising a metering device,
   in which the metering device pressurizes the trap column to the first pressure while the trap column is isolated from the ambient atmosphere, and
   wherein the introducing the sample into the trap column comprises: sucking a volume of the sample into the liquid chromatography system with the metering device.

2. The method according to claim 1, wherein the first pressure exceeds the ambient pressure by at least 10 bar.

3. The method according to claim 1, wherein the first pressure exceeds the ambient pressure by a value ranging from 10 bar to 1500 bar.

4. The method according to claim 1, wherein the introducing the sample into the trap column includes adhering constituents of the sample to the trap column.

5. The method according to claim 1 further comprises:
   providing a fluid connection between the trap column and an analytical pump, wherein the fluid connection between the trap column and the analytical pump is provided simultaneously with providing the fluid connection between the trap column and the separation column.

6. The method according to claim 1, wherein the metering device comprises a first connection port and a second connection port, the first connection port and the second connection port both being configured to fluidly connect the metering device to other components of the liquid chromatography system.

7. The method according to claim 1, wherein the liquid chromatography system comprises:
   a needle;
   a seat configured to receive the needle; and
   a first distribution valve; and
   wherein the step of introducing the sample into the trap column further comprises:
   moving the needle to a sample reservoir;
   sucking the sample into the needle from the sample reservoir and optionally sucking the sample into a tubing section adjacent to the needle;
   moving the needle to the seat;
   setting the first distribution valve to provide a fluid connection between the seat and the trap column; and
   pushing the sample into the trap column.

8. The method according to claim 7, in which the step of providing the fluid connection between the trap column and the separation column comprises setting the first distribution valve to a flush configuration.

9. The method according to claim 1, wherein the step of pushing the sample into the trap column with the metering device.

10. The method according to claim 8, in which the first distribution valve comprises:
    a plurality of ports and a plurality of connecting elements configured to changeably connect the plurality of ports of the first distribution valve, the plurality of ports of the first distribution valve comprises:
    a first port directly fluidly connected to the seat;
    a second port and a third port that are both directly fluidly connected to the trap column;
    a fourth port directly fluidly connected to the separation column;
    a fifth port directly fluidly connected to the analytical pump; and
    a sixth port directly fluidly connected to a second distributor valve;
    wherein the liquid chromatography system further comprises the second distributor valve, wherein the second distributor valve includes a plurality of ports and a plurality of connecting elements configured to changeably connect the ports of the second distributor valve, the plurality of ports of the second distribution valve comprises:
    a seventh port directly fluidly connected to the first distributor valve;
    an eighth port directly fluidly connected to a waste;
    a ninth port directly fluidly connected to a first solvent reservoir; and
    a tenth port directly fluidly connected to the metering device.

11. The method according to claim 1, wherein the step of introducing the sample into the trap column comprises:
    flowing the sample into the trap column in a first flow direction, and
    wherein the step of supplying the sample from the trap column to the separation column comprises:
    flowing the sample leaving the trap column in a second flow direction, in which the second flow direction is opposite to the first flow direction.

12. The method according to claim 1, wherein the step of introducing the sample into the trap column comprises:
   flowing the sample into the trap column in a first flow direction, and
   wherein the step of supplying the sample from the trap column to the separation column comprises:
      flowing the sample leaving the trap column in the first flow direction.

13. The method according to claim 1, wherein the method comprises:
   depressurizing the trap column with the metering device after supplying the sample from the trap column to the separation column.

14. A liquid chromatography system comprising
   A) a needle,
   B) a metering device configured to be fluidly connected to the needle;
   C) a seat configured to receive the needle;
   D) a trap column;
   E) a separation column;
   F) an analytical pump;
   G) a first distributor valve comprising:
      a) a plurality of ports; and
      b) a plurality of connecting elements configured to changeably connect to the plurality of ports of the first distributor valve, wherein the plurality of ports of the first distributor valve comprises:
         i) a first port directly fluidly connected to the seat;
         ii) a second port and a third port that are both directly fluidly connected to the trap column;
         iii) a fourth port directly fluidly connected to the separation column;
         iv) a fifth port directly fluidly connected to the analytical pump;
   wherein the liquid chromatography system is configured to isolate the trap column from an ambient atmosphere and to pressurize the trap column with the metering device to a pressure exceeding the ambient pressure without the trap column being fluidly connected to the separation column, and wherein the liquid chromatography system is configured to suck a volume of a sample into the liquid chromatography system with the metering device.

15. The liquid chromatography system according to claim 14, wherein liquid chromatography system is configured to isolate the trap column from an ambient atmosphere and to pressurize the trap column to a pressure exceeding the ambient pressure without the trap column being fluidly connected to the separation column and without the trap column being fluidly connected to the analytical pump.

16. The liquid chromatography system according to claim 14, wherein the plurality of ports of the first distribution valve further comprises a sixth port directly fluidly connected to a second distributor valve; the liquid chromatography system further comprises:
   H) a waste;
   I) a first solvent reservoir;
   J) the second distributor valve comprising:
      a) a plurality of ports and
      b) a plurality of connecting elements configured to changeably connect the ports of the second distributor valve, wherein the plurality of ports of the second distribution valve comprises:
         i) a seventh port directly fluidly connected to the first distributor valve;
         ii) an eighth port directly fluidly connected to the waste;
         iii) a ninth port directly fluidly connected to the first solvent reservoir; and
         iv) a tenth port directly fluidly connected to the metering device.

17. The liquid chromatography system according to claim 14, wherein the metering device comprises a first connection port and a second connection port, wherein the second connection port of the metering device is fluidly connected to the needle and the first connection port is fluidly connected to the tenth port of the second distributor valve.

* * * * *